US008843949B2

(12) United States Patent
Miyazaki (10) Patent No.: US 8,843,949 B2
(45) Date of Patent: Sep. 23, 2014

(54) APPARATUS, METHOD, AND PROGRAM FOR PROCESSING INFORMATION

(75) Inventor: Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1048 days.

(21) Appl. No.: 12/766,535

(22) Filed: Apr. 23, 2010

(65) Prior Publication Data

US 2010/0281497 A1 Nov. 4, 2010

(30) Foreign Application Priority Data

May 1, 2009 (JP) ................................ P2009-112016

(51) Int. Cl.
| H04H 60/33 | (2008.01) |
| G06F 17/30 | (2006.01) |
| H04N 5/76 | (2006.01) |

(52) U.S. Cl.
CPC .... *G06F 17/30032* (2013.01); *G06F 17/30053* (2013.01); *H04N 5/76* (2013.01); *G06F 17/30035* (2013.01)
USPC ................................. 725/10; 725/12; 725/14

(58) Field of Classification Search
USPC .............................................. 725/10, 12, 14
See application file for complete search history.

(56) References Cited

U.S. PATENT DOCUMENTS

| 7,434,244 B2 * | 10/2008 | Popov et al. ...................... 725/34 |
| 2009/0100458 A1 * | 4/2009 | Chan et al. ....................... 725/34 |

FOREIGN PATENT DOCUMENTS

| JP | 2006-252758 | 9/2006 |
| JP | 2007-172523 | 7/2007 |
| JP | 2007-207218 | 8/2007 |
| JP | 2007-241888 | 9/2007 |

* cited by examiner

*Primary Examiner* — Nnenna Ekpo
(74) *Attorney, Agent, or Firm* — Finnegan, Henderson, Farabow, Garrett & Dunner, L.L.P.

(57) ABSTRACT

An information processing apparatus includes: importance calculation means configured to calculate an experience importance degree of content for a user based the basis of a relationship among a reaction analysis result obtained by performing predetermined analysis on a reaction (attitude) of the user to the content at the time when the user experiences the content, an environment analysis result obtained by performing predetermined analysis on an external environment of the user at the time when the user experiences the content, a signal analysis result obtained by performing predetermined analysis on a video signal or voice signal of the content, and a language analysis result obtained by performing predetermined language analysis on language information described about the content; and determination means configured to, if the experience importance degree of the content calculated by the importance calculation means is high, determine the content as recommendation content to be recommended to the user.

10 Claims, 7 Drawing Sheets

| TUNE | GENRE | LYRICS | MOOD | EXPERIENCE IMPORTANCE DEGREE |
|---|---|---|---|---|
| TUNE A | POP | BROKEN HEART (0.8), CONVENIENCE STORE (1.0), VIGOR (0.9), SUNDAY, PHONE MESSAGE, ... | SAD (1.0), HEALING (1.0), REFRESHING, ROMANTIC, HOPEFUL | 4.7 |
| TUNE B | ROCK | BETRAY, COMFORT, PAIN, DAWN (0.3), HUNCH, ... | SAD (0.8), SENTIMENTAL, FRAIL, GLOOMY, UNEASY (1.0) | 2.1 |
| TUNE C | POP | ROOM (1.0), LONELINESS, NIGHT (1.0), HONESTY, MISUNDERSTANDING, ... | SAD, LONELY (0.7), FRAIL, DEAR, HOPEFUL | 2.7 |
| TUNE D | POP | LOVE, BLUE (0.5), SIGH (0.9), TEARS (0.8), PASSION, ... | SAD, HEALING, REFRESHING, ROMANTIC, GLOOMY | 2.2 |
| TUNE E | ROCK | SNOW, ANGER, ILLUSION, NIGHT (1.0), LONELINESS (0.8), ... | SAD (1.0), SWEET, HOPELESS, IN LOVE (0.6), UNEASY (0.5) | 3.9 |
| TUNE F | POP | CHRISTMAS, LOVER, SNOW, STREET, WINK, ... | SAD, ENCOURAGING, SWEET, ROMANTIC, HAPPY | 0.0 |
| TUNE G | POP | AGE, CHANGE, SIDE TRIP, TEARS (0.8), WIND, ... | SAD, PASSIONATE, LONELY (1.0), GLOOMY, DISTURBED | 1.8 |
| TUNE H | ROCK | SMILE (0.9), WORLD, PURE HEART, DANGER, DEMON, ... | SAD (0.7), GROOVY (0.8), FREE-HEARTED, DEAR, IN LOVE (0.1) | 2.5 |
| TUNE I | JAZZ | DREAM, STREET, EVENFALL (0.8), SEASON, SIGH (0.9) | SAD, HEALING, ELEGANT, SWEET (0.9), GLAD | 2.6 |
| TUNE J | OTHER POPULAR MUSIC | WORLD, FLOWER, WORKING HARD, SMILE (0.7), PLACE, ... | SAD, HAPPY (1.0), COMFORTABLE, NOSTALGIC (0.7), WARM | 2.4 |

FIG. 10

APPARATUS, METHOD, AND PROGRAM FOR PROCESSING INFORMATION

BACKGROUND OF THE INVENTION

1. Field of the Invention

The present invention relates to an apparatus, a method, and a program for processing information and in particular to an apparatus, a method, and a program for processing information that can recommend optimum content corresponding to the situation of the user.

2. Related Art

Related-art content recommendation systems retrieve and recommend content on the basis of a keyword inputted by the user or meta-data selected by the user on web pages or audio/visual (AV) apparatuses.

Incidentally, there has been proposed a technology that stores, as episodes, the date and time when a tune has been outputted in the past, the place where the tune has been outputted, the name of the tune, the apparatus that has outputted the tune, the accompanying person, and the like and, when the tune is retrieved later, outputs the episodes as voices or character strings (see Japanese Unexamined Patent Application Publication No. 2006-252758).

SUMMARY OF THE INVENTION

Unfortunately, the related-art content recommendation systems do not recommend content corresponding to the situation of the user, that is, content corresponding to an episode that was particularly impressive for the user.

Accordingly, it is desirable to recommend optimum content corresponding to the situation of the user on the basis of information about a reaction of the user shown when the user viewed and listened to content in the past and the user's surroundings at that time and information about the content itself.

An information processing apparatus according to an embodiment of the present invention includes: importance calculation means configured to calculate an experience importance degree of content for a user on the basis of a relationship among a reaction analysis result obtained by performing a predetermined analysis on a reaction of the user to the content at the time when the user experiences the content, the reaction being an attitude of the user, an environment analysis result obtained by performing a predetermined analysis on an external environment of the user at the time when the user experiences the content, a signal analysis result obtained by performing a predetermined analysis on a video signal or voice signal of the content, and a language analysis result obtained by performing a predetermined language analysis on language information described about the content; and determination means configured to, if the experience importance degree of the content calculated by the importance calculation means is high, determine the content as recommendation content to be recommended to the user.

The information processing apparatus may further include relationship degree calculation means configured to calculate a relationship degree indicating a degree of a relationship among the reaction analysis result, the environment analysis result, the signal analysis result, and the language analysis result. The importance degree calculation means may calculate the experience importance degree by performing a predetermined operation on the relationship degree calculated by the relationship degree calculation means.

The relationship degree calculation means may calculate the relationship degree by performing a feature quantity analysis or language analysis on the reaction analysis result, the environment analysis result, the signal analysis result, and the language analysis result.

The information processing apparatus may further include sorting means configured to sort pieces of content experienced by the user in accordance with corresponding experience importance degrees calculated by the importance degree calculation means. The determination means may determine, as the recommendation content, a piece of content having a high experience importance degree among the pieces of content sorted by the sorting means.

The determination means may determine, as the recommendation content, content having an importance degree higher than a predetermined threshold among the pieces of content sorted by the sorting means.

The sorting means may sort the pieces of content in the descending order of the corresponding experience importance degrees, and the determination means may determine, as the recommendation content, a piece of content having an experience importance degree higher than a predetermined threshold among the pieces of content sorted by the sorting means.

The sorting means may sort the pieces of content in the descending order of the corresponding experience importance degrees, and the determination means may determine, as the recommendation content, pieces of content corresponding to highest n experience importance degrees among the pieces of content sorted by the sorting means.

The information processing apparatus may further include retrieval means configured to retrieve a piece of content from among the pieces of content on the basis of one or both of a reaction analysis result and an environment analysis result performed after the pieces of content are experienced. The sorting means may sort pieces of content retrieved by the retrieval means in accordance with corresponding experience importance degrees.

An information processing method including the steps of: calculating an experience importance degree of content for a user on the basis of a relationship among a reaction analysis result obtained by performing a predetermined analysis on a reaction of the user to the content at the time when the user experiences the content, the reaction being an attitude of the user, an environment analysis result obtained by performing a predetermined analysis on an external environment of the user at the time when the user experiences the content, a signal analysis result obtained by performing a predetermined analysis on a video signal or voice signal of the content, and a language analysis result obtained by performing a predetermined language analysis on language information described about the content; and if the experience importance degree of the content calculated in the experience importance degree calculation step is high, determining the content as recommendation content to be recommended to the user.

A program causing a computer to perform a process including the steps of: calculating an experience importance degree of content for a user on the basis of a relationship among a reaction analysis result obtained by performing a predetermined analysis on a reaction of the user to the content at the time when the user experiences the content, the reaction being an attitude of the user, an environment analysis result obtained by performing a predetermined analysis on an external environment of the user at the time when the user experiences the content, a signal analysis result obtained by performing a predetermined analysis on a video signal or voice signal of the content, and a language analysis result obtained by performing a predetermined language analysis on language information described about the content; and if the experience importance degree of the content calculated in the experience importance degree calculation step is high, determining the content as recommendation content to be recommended to the user.

According to an embodiment of the present invention, an experience importance degree of content for a user is calculated on the basis of a relationship among a reaction analysis result obtained by performing a predetermined analysis on a reaction of the user to the content at the time when the user experiences the content, the reaction being an attitude of the user, an environment analysis result obtained by performing a predetermined analysis on an external environment of the user at the time when the user experiences the content, a signal analysis result obtained by performing a predetermined analysis on a video signal or voice signal of the content, and a language analysis result obtained by performing a predetermined language analysis on language information described about the content, and if the calculated experience importance degree of the content is high, the content is determined as recommendation content to be recommended to the user.

The embodiments of the present invention allow recommending optimum content corresponding to the situation of the user.

DESCRIPTION OF THE PREFERRED EMBODIMENTS

Now, an embodiment of the present invention will be described with reference to the accompanying drawings.

Example Configuration of Information Processing System

Figure 1:
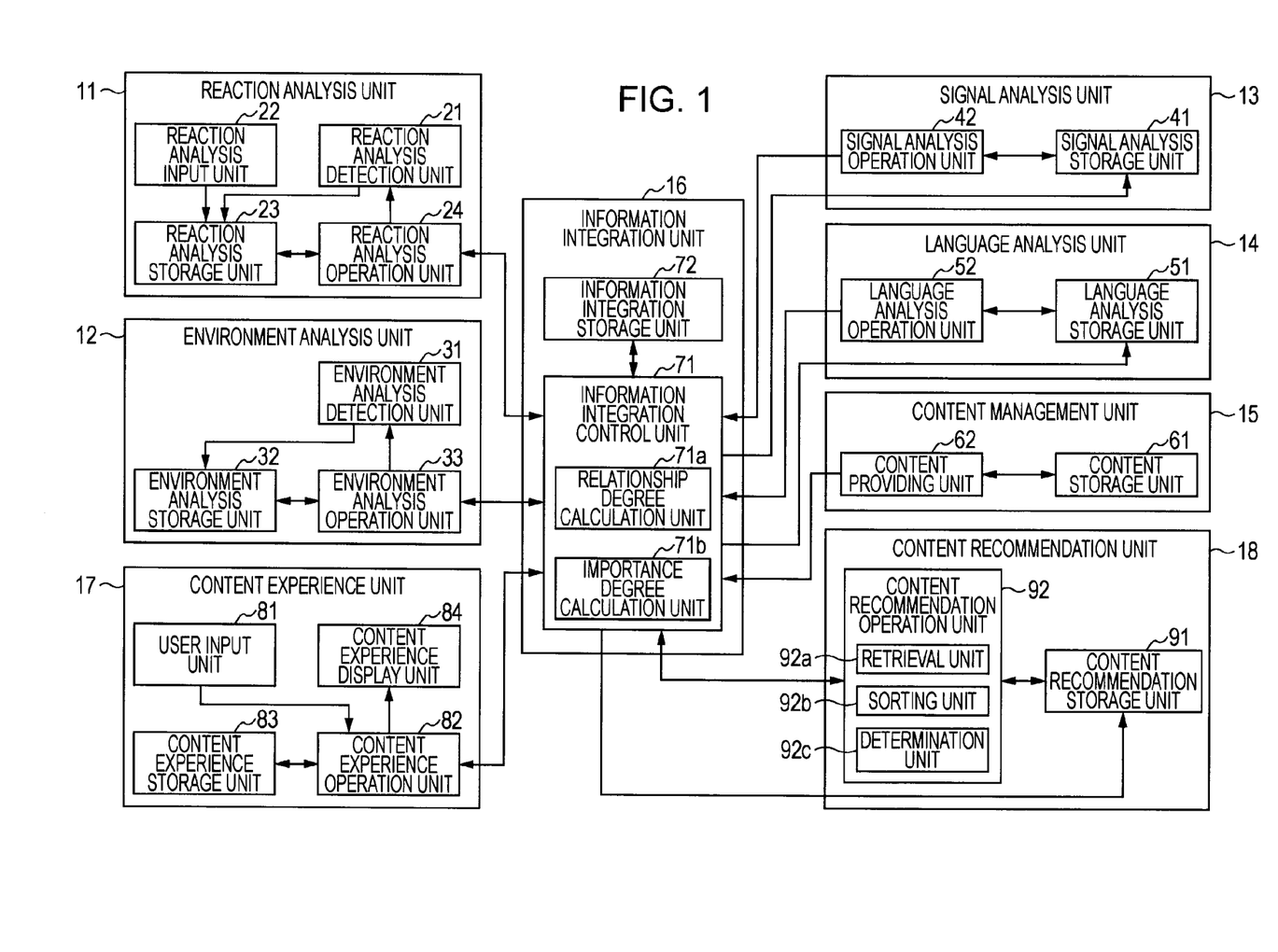
FIG. 1 is a block diagram showing an example configuration of an information processing system according to an embodiment of the present invention.

FIG. 1 shows an example configuration of an information processing system according to an embodiment of the present invention. The information processing system of FIG. 1 handles content. The "content" here refers to what are produced through humans' creative activities. Examples of content include characters, drawings, colors, voices, motions, images or combinations thereof, of movies, music, plays, literature, photographs, comics, animation, computer games, and others, and programs for providing information related to these items via a computer. In this specification, so-called "content data," that is, what are produced through humans' creative activities and are processible by apparatuses, for example, electrical signals or what is stored in a memory is also referred to as content without being distinguished.

The information processing system of FIG. 1 includes a reaction analysis unit 11, an environment analysis unit 12, a signal analysis unit 13, a language analysis unit 14, a content management unit 15, an information integration unit 16, a content experience unit 17, and an integration control unit.

The reaction analysis unit 11 includes a mouse, a keyboard, a remote controller, a voice recognition apparatus, an image recognition apparatus, a biosensor, and the like. The reaction analysis unit 11 detects information, such as an input using a pointing device, a voice, an image, or a biological reaction, which is a reaction (attitude) of the user at the time when the user views and listens to content. The reaction analysis unit 11 includes a reaction analysis detection unit 21, a reaction analysis input unit 22, a reaction analysis storage unit 23, and a reaction analysis operation unit 24.

The reaction analysis detection unit 21 is composed of, for example, a voice recognition apparatus, an image recognition apparatus, and a biosensor and detects or determines, in real time, information corresponding to the voice, face image, and biological reaction of the user at the time when the user views and listens to content and provides the information to the reaction analysis storage unit 23.

The reaction analysis input unit 22 is composed of, for example, a pointing device, such as a mouse, keyboard, or remote controller, and provides information corresponding to an input made by the user using the pointing device when the user views and listens to content, to the reaction analysis storage unit 23.

The reaction analysis storage unit 23 chronologically stores information corresponding to the voice, image, and biological reaction of the user from the reaction analysis detection unit 21 and information corresponding to the input using the pointing device from the reaction analysis input unit 22 (hereafter both referred to as "reaction information"). The reaction analysis storage unit 23 also stores an analysis result provided by the reaction analysis operation unit 24.

The reaction analysis operation unit 24 reads pieces of reaction information stored in the reaction analysis storage unit 23 in turn while controlling the operation of the reaction analysis detection unit 21, and performs a predetermined data analysis on each read reaction information and provides the obtained analysis result (hereafter referred to as a "reaction analysis result") to the information integration unit 16. The reaction analysis operation unit 24 also provides the obtained reaction analysis result to the reaction analysis storage unit 23 to store it.

The environment analysis unit 12 includes a radio wave clock, a global positioning system (GPS) receiver, a temperature sensor, and the like. The environment analysis unit 12 detects information about the external environment of the user at the time when the user views and listens to content, such as the date and time, place, or temperature, and user's other surroundings. The environment analysis unit 12 includes an environment analysis detection unit 31, an environment analysis storage unit 32, and an environment analysis operation unit 33.

The environment analysis detection unit 31 is composed of, for example, a radio wave clock, a GPS receiver, a temperature sensor, and the like and detects or determines information about the date and time, place, temperature, and the like at the time when the user views and listens to content and user's other surroundings (hereafter referred to as "environment information") in real time and provides the information to the environment analysis storage unit 32.

The environment analysis storage unit 32 chronologically stores pieces of environment information from the environment analysis detection unit 31. The environment analysis storage unit 32 also stores analysis results provided by the environment analysis operation unit 33.

The environment analysis operation unit 33 reads pieces of environment information stored in the environment analysis storage unit 32 in turn, performs a predetermined data analysis on each read environment information, and provides the obtained analysis result (hereafter referred to as an "environment analysis result") to the information integration unit 16, as well as provides the result to the environment analysis storage unit 32 to store it.

As seen, the reaction analysis unit 11 and environment analysis unit 12 perform an analysis on information about the situation of the user himself/herself or user's surroundings at the time when the user views and listens to content. Hereafter, the obtained reaction and environment analysis results may be collectively referred to as a "user situation analysis result" if necessary.

The signal analysis unit 13 is composed of, for example, a server or client computer or a software module and performs a signal analysis on image signals and voice signals of content. The signal analysis unit 13 includes a signal analysis storage unit 41 and a signal analysis operation unit 42.

The signal analysis storage unit 41 stores (retains) content provided by the content management unit 15 via the information integration unit 16. The signal analysis storage unit 41 also stores analysis results provided by the signal analysis operation unit 42.

The signal analysis operation unit 42 reads content stored in the signal analysis storage unit 41, extracts image signals and voice signals from the content, and performs a predetermined signal analysis on these signals. The signal analysis operation unit 42 provides the result of the signal analysis to the information integration unit 16, as well as provides the result to the signal analysis storage unit 41 to store it.

The language analysis unit 14 is composed of, for example, a server or client computer or a software module and performs a predetermined language analysis on language information such as sentences or words written about content. The language analysis unit 14 includes a language analysis storage unit 51 and a language analysis operation unit 52.

The language analysis storage unit 51 stores language information provided by the content management unit 15 via the information integration unit 16. The language information here is meta-data about content, such as sentences or words written about content. The language analysis storage unit 51 also stores analysis results provided by the language analysis operation unit 52.

The language analysis operation unit 52 reads content-related language information stored in the language analysis storage unit 51 and performs a predetermined language analysis on the read information. The language analysis operation unit 52 provides the result of the language analysis to the information integration unit 16, as well as provides the result to the language analysis storage unit 51 to store it.

As seen, the signal analysis unit 13 and language analysis unit 14 perform an analysis on signals or information about content. Hereafter, the obtained signal and language analysis results may be collectively referred to as a "content analysis result" if necessary.

The content management unit 15 is composed of, for example, a broadcast apparatus, a server or client computer, or database software and manages content. The content management unit 15 includes a content storage unit 61 and a content providing unit 62.

The content storage unit 61 stores content such as images, e.g., moving images or still images, voices, and web pages described above, as well as meta-data about the content.

The content providing unit 62 is composed of, for example, a distribution server of a television broadcast system, a streaming content server on the Internet, or the like and provides content and meta-data thereabout retained by the content storage unit 61 to the information integration unit 16.

The information integration unit 16 relays or integrates various types of information in the information processing system shown in FIG. 1. For example, the information integration unit 16 provides content from the content management unit 15 to the signal analysis unit 13 or content experience unit 17 or provides meta-data about content from the content management unit 15 to the language analysis unit 14. The information integration unit 16 also integrates analysis results from the reaction analysis unit 11, environment analysis unit 12, signal analysis unit 13, and language analysis unit 14 and provides the integrated results to the content recommendation unit 18. The information integration unit 16 includes an information integration control unit 71 and an information integration storage unit 72.

The information integration control unit 71 controls relay and integration of information in the information processing system shown in FIG. 1. For example, upon a request from the content experience unit 17, the information integration control unit 71 provides content provided by the content management unit 15 to the content experience unit 17. At that time, the information integration control unit 71 provides the content provided by the content management unit 15 to the signal analysis unit 13, as well as provides meta-data about the content provided by the content management unit 15 to the language analysis unit 14.

The information integration control unit 71 also obtains an experience importance degree representing the importance degree of viewing and listening of content by the user on the basis of the relationship among analysis results from the reaction analysis unit 11, environment analysis unit 12, signal analysis unit 13, and language analysis unit 14. Hereafter, viewing and listening of content by the user will be referred to as a "content experience." That is, the information integration control unit 71 obtains the importance degree of a content experience. Also, upon a request from the content experience unit 17, the information integration control unit 71 provides information about recommendation content (content recommendation) provided by the content recommendation unit 18 to the content experience unit 17. The recommendation content here refers to content to be recommended to the user.

The information integration control unit 71 includes a relationship degree calculation unit 71a and an importance degree calculation unit 71b.

The relationship degree calculation unit 71a calculates an experience relationship degree indicating the degree of the relationship among a reaction analysis result from the reaction analysis unit 11, an environment analysis result from the environment analysis unit 12, a signal analysis result from the signal analysis unit 13, and a language analysis result from the language analysis unit.

The importance degree calculation unit 71b performs a predetermined operation on the experience relationship degree calculated by the relationship degree calculation unit 71a, calculates the importance degree of a content experience, and provides the experience importance degree to the content recommendation unit 18, as well as provides the experience importance degree to the information integration storage unit 72 to store it. The experience importance degree is increased as the experience relationship degree among the analysis results is increased. Hereafter, a content experience having a particularly high importance degree, that is, a content experience particularly impressive for the user will be referred to as an "episode," if necessary.

The information integration storage unit 72 stores the importance degree of a content experience from the information integration control unit 71 in such a manner that the importance degree is associated with information indicating content (e.g., content name) corresponding to the content experience.

The content experience unit 17 is composed of a client computer, consumer electronics (CE) apparatus, portable information terminal apparatus, or the like by which the user can view an listen to content, that is, the user can experience content. The content experience unit 17 includes a user input unit 81, a content experience operation unit 82, a content experience storage unit 83, and a content experience display unit 84.

The user input unit 81 is composed of input devices for operating the content experience unit 17, such as a keyboard, mouse, remote controller, and touch panel. Information corresponding to an operation performed by the user on the user input unit 81 is provided to the content experience operation unit 82. The above-mentioned reaction analysis input unit 22 may be configured so that it also functions as the user input unit 81.

The content experience operation unit 82 provides the information based on the user operation from the user input unit 81 to the information integration unit 16 and thus obtains information corresponding to the information based on the user operation, from the information integration unit 16. For example, the content experience operation unit 82 provides information on the basis of a user operation indicating viewing and listening of content to the information integration unit 16 and thus obtains the content from the content management unit 15 via the information integration unit 16 and provides the content to the content experience display unit 84. Also, for example, the content experience operation unit 82 provides information corresponding to a user operation indicating acquisition of a content recommendation to the information integration unit 16 and thus obtains a content recommendation from the content management unit 18 via the information integration unit 16 and provides the recommendation to the content experience display unit 84. The content experience operation unit 82 also provides various types of information provided by the information integration unit 16 to the content experience storage unit 83, as necessary. The content experience operation unit 82 also controls display on the content experience display unit 84. For example, the information integration unit 82 performs control such that content or a content recommendation from the content management unit 16 is properly laid out on a monitor or graphic user interface (GUI) screen serving as the content experience display unit 84.

The content experience storage unit 83 stores various types of information provided by the content experience operation unit 82.

The content experience display unit 84 is composed of output devices, such as a GUI screen for displaying a content recommendation result or the like, a monitor capable of displaying content itself, speaker, and printer. For example, under the control of the content experience operation unit 82, the content experience display unit 84 displays content or a content recommendation in accordance with various types of information from the content experience operation unit 82.

The content recommendation unit 18 is composed of, for example, a server or client computer, software module, or the like and recommends content to the user. The content recommendation unit 18 includes a content recommendation storage unit 91 and a content recommendation operation unit 92.

The content recommendation storage unit 91 stores various types of information provided by the information integration unit 16, for example, the importance degree of a content experience indicating the result of integration of the analysis results, or the analysis results themselves. The content recommendation storage unit 91 also stores user preference information that the content recommendation operation unit 92 generates on the basis of the above-mentioned information. The user preference information here refers to information indicating whether the user had a positive feeling or negative feeling about content corresponding to a content experience. The content recommendation storage unit 91 also stores a content recommendation made by the content recommendation operation unit 92.

The content recommendation operation unit 92 retrieves content corresponding to an episode, which is a content experience particularly impressive for the user, by using information stored in the content recommendation storage unit 91, specifically, by using the importance degree of a content experience and provides a content recommendation to the information integration unit 16. The content recommendation operation unit 92 also provides the recommendation content to the content recommendation storage unit 91 to store it. The content recommendation operation unit 92 also generates user preference information using various types of information provided by the information integration unit 16 and provides the user preference information to the content recommendation storage unit 91.

The content recommendation operation unit 92 includes a retrieval unit 92a, a sorting unit 92b, and a determination unit 92c.

In a case where the user newly experiences content, the retrieval unit 92a retrieves content corresponding to information inputted through a user operation from among pieces of content corresponding to experience importance degrees in the content recommendation storage unit 91.

The sorting unit 92b sorts pieces of content retrieved by the retrieval unit 92a, according to corresponding content experience importance degrees. More specifically, the sorting unit 92b sorts pieces of content retrieved by the retrieval unit 92a in the descending order of corresponding experience importance degrees.

The determination unit 92c determines, as recommendation content to be recommended to the user, content corresponding to a content experience having a high importance degree, that is, content corresponding to an episode among the pieces of content sorted by the sorting unit 92b and provides a content recommendation to the information integration unit 16.

In the information processing system of FIG. 1, the reaction analysis unit 11, environment analysis unit 12, signal analysis unit 13, language analysis unit 14, content management unit 15, content experience unit 17, and content recommendation unit 18 may be connected to the information integration unit 16 in any form, whether by wire or wirelessly, whether via the Internet or an intranet.

Information Integration Process by Information Processing System

Figure 2:
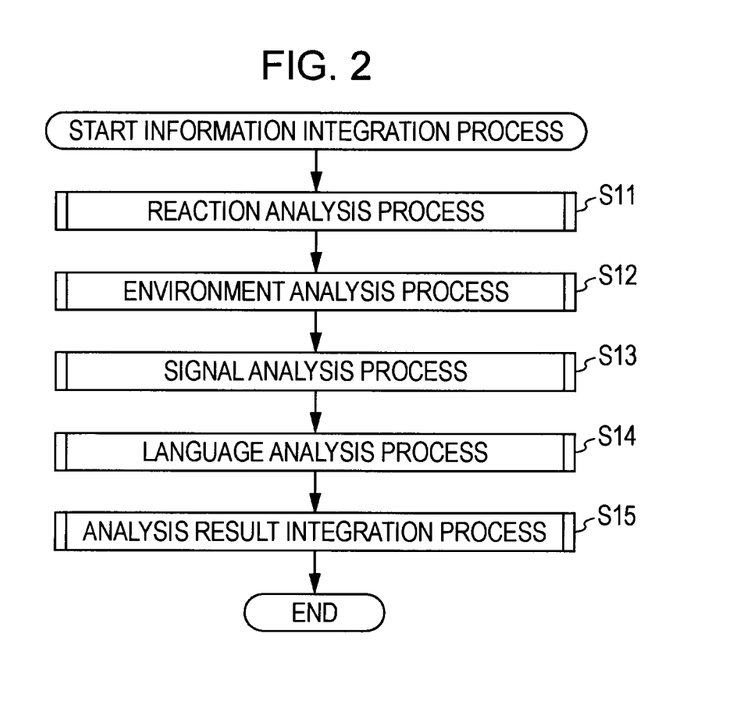
FIG. 2 is a flowchart showing an information integration process that the information processing system performs.

Referring now to FIG. 2, an information integration process that the information processing system of FIG. 1 performs will be described. The information integration process is started when the user starts to view and listen to content by operating the user input unit 81 of the content experience unit 17.

In step S11, the reaction analysis unit 11 performs a reaction analysis process, more specifically, performs a predetermined data analysis on reaction information, which is information such as an input by the user using a pointing device, a voice, an image, a biological reaction, or the like of the user at the time when the user views and listens to content.

Reaction Analysis Process by Reaction Analysis Unit

Figure 3:
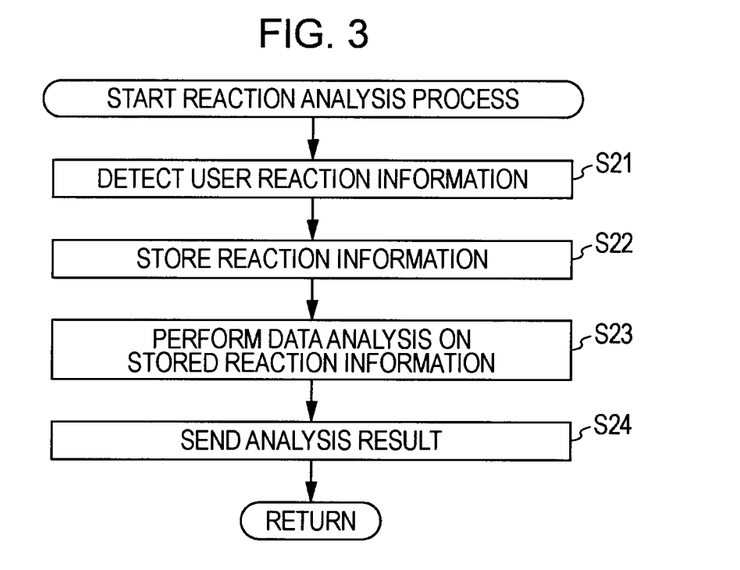
FIG. 3 is a flowchart showing a reaction analysis process that a reaction analysis unit performs.

Referring now to FIG. 3, a reaction analysis process that the reaction analysis unit 11 performs will be described.

In step S21, the reaction analysis unit 11 detects user reaction information. More specifically, the reaction analysis detection unit 21 detects or determines, in real time, information corresponding to a voice made by the user and a face image and a biological reaction of the user at the time when the user views and listens to content under the control of the reaction analysis operation unit 24 and provides the information to the reaction analysis storage unit 23. The reaction analysis input unit 22 provides, to the reaction analysis storage unit 23, information corresponding to an operation, such as an input using a pointing device, performed by the user at the time when the user views and listens to content, for example, information corresponding to an email or diary inputted by the user at that time or a description inputted by the user on a web page via the Internet at that time.

In step S22, the reaction analysis storage unit 23 chronologically stores the above-mentioned pieces of reaction information, that is, the information corresponding to the voice, image, and biological reaction of the user provided by the reaction analysis detection unit 21 and the information corresponding to the input using the pointing device provided by the reaction analysis input unit 22.

In step S23, the reaction analysis operation unit 24 reads the pieces of reaction information stored in the reaction analysis storage unit 23 in turn and performs a predetermined data analysis on each read reaction information. For example, the reaction analysis operation unit 24 reads, from the reaction analysis storage unit 23, information indicating a description "I am brokenhearted . . . " inputted into a dairy or a voice "I am sad" made by the user when listening to a tune A or information indicating the user's body heat, blood pressure, or heart rate at the time when the user's energy is increased by listening to the tune A, performs a data analysis on such information, and obtains a reaction analysis result in the form of text data.

In step S24, the reaction analysis operation unit 24 provides the obtained reaction analysis result to the information integration unit 16. For example, the reaction analysis operation unit 24 provides, to the information integration unit 16, text data indicating "I am heartbroken" or "I am sad," or "an increase in energy" set on the basis of the value of the body heat, blood pressure, or heart rate, obtained as the result of the data analysis.

Referring back to FIG. 2, in step S12, the environment analysis unit 12 performs an environment analysis process, more specifically, performs a predetermined data analysis on environment information about the date and time, place, temperature, or the like at the time when the user views and listens to content and user's other surroundings.

Environment Analysis Process by Reaction Analysis Unit

Figure 4:
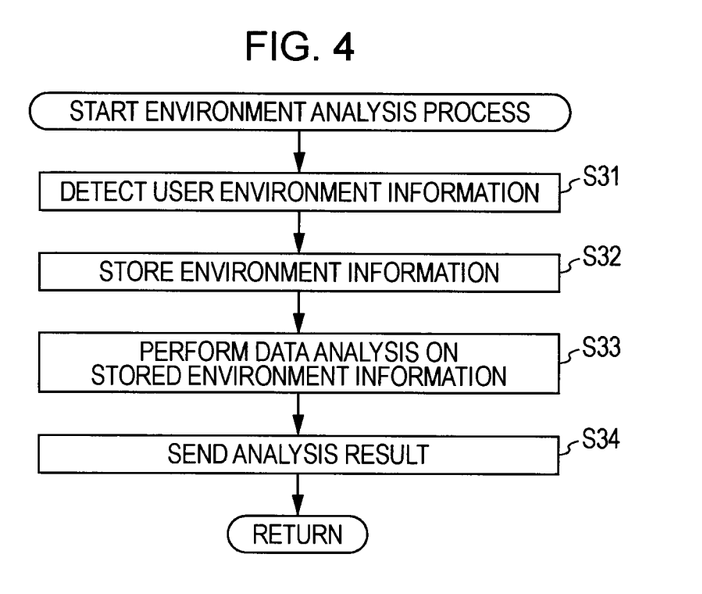
FIG. 4 is a flowchart showing an environment analysis process that an environment analysis unit performs.

Referring now to FIG. 4, an environment analysis process that the reaction analysis unit 12 performs will be described.

In step S31, the environment analysis detection unit 31 detects or determines, in real time, environment information about the date and time, place, temperature, season, current topics, fashions, or the like at the time when the user views and listens to content under the control of the environment analysis operation unit 33 and provides the environment information to the environment analysis storage unit 32.

In step S32, the environment analysis storage unit 32 chronologically stores pieces of environment information provided by the environment analysis detection unit 31.

In step S33, the environment analysis operation unit 33 reads the pieces of environment information stored in the environment analysis storage unit 32 in turn and performs a predetermined data analysis on each read environment information. For example, the environment analysis operation unit 33 reads, from the environment analysis storage unit 32, positional information indicating the position of a convenience store to which the user went while listening to the tune A or information indicating "healing," a vogue word in those days, performs a data analysis on such information, and obtains an environment analysis result in the form of text data.

In step S34, the environment analysis operation unit 33 provides the obtained environment analysis result to the information integration unit 16. For example, the environment analysis operation unit 33 provides, to the information integration unit 16, text data indicating positional information "convenience store" or a vogue word "healing" obtained as the result of the data analysis.

Referring back to FIG. 2, in step S13, the signal analysis unit 13 performs a signal analysis process, more specifically, performs a signal analysis on image signals and voice signals of content.

Signal Analysis Process by Signal Analysis Unit

Figure 5:
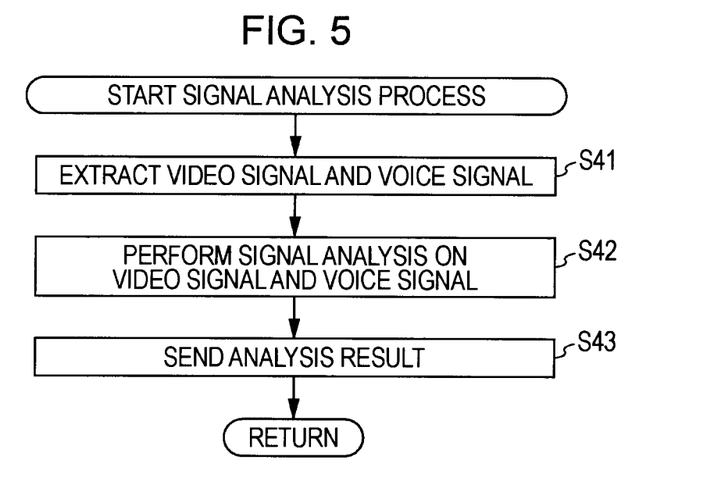
FIG. 5 is a flowchart showing a signal analysis process that a signal analysis unit performs.

Referring now to a flowchart of FIG. 5, a signal analysis process that the signal analysis unit 13 performs will be described.

In step S41, the signal analysis operation unit 42 reads content stored in the signal analysis storage unit 41 and extracts image signals and voice signals from the content.

In step S42, the signal analysis operation unit 42 performs a signal analysis, such as a feature quantity analysis, on the image signals and voice signals of the content read from the signal analysis storage unit 41. For example, the signal analysis operation unit 42 performs a signal analysis on voice signals of the read content, tune A, and obtains an analysis result in the form of a feature quantity.

In step S43, the signal analysis operation unit 42 provides the signal analysis result to the information integration unit 16. For example, the signal analysis operation unit 42 provides, to the information integration unit 16, moods ("sad," "healing," "refreshing," "romantic," "hopeful," etc.), genres ("pop," "rock," "jazz," etc.), categories ("tune," "movie," etc.), and the like, which are feature quantities obtained as the signal analysis result.

Referring back to FIG. 2, in step S14, the language analysis unit 14 performs a language analysis process, more specifically, performs a language analysis on language information about content.

Language Analysis Process by language Analysis Unit

Figure 6:
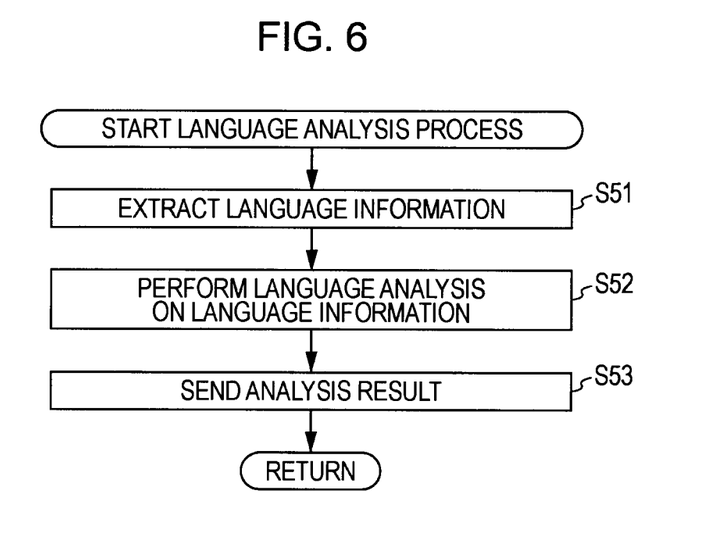
FIG. 6 is a flowchart showing a language analysis process that a language analysis unit performs.

Referring now to a flowchart of FIG. 6, a language analysis process that the language analysis unit 14 performs will be described.

In step S51, the language analysis operation unit 52 reads content stored in the language analysis storage unit 51 and extracts, from the content, language information, such as sentences or words described about the content.

In step S52, the language analysis operation unit 52 performs a language analysis, such as a morphological analysis, on the language information about the content read from the language analysis storage unit 51. For example, the language analysis operation unit 52 performs a language analysis on the extracted language information, the lyrics of the tune A, and obtains text data ("broken heart," "convenient store," "vigorous," "Sunday," "phone message, etc.), which are lyrics phrases, as the analysis result.

In step S53, the language analysis operation unit 52 provides the language analysis result to the information integration unit 16. For example, the language analysis operation unit 52 provides, to the information integration unit 16, the text data, which are lyrics phrases of the tune A, obtained as the language analysis result.

Referring back to FIG. 2, in step S15, the information integration unit 16 performs an information integration process, more specifically, integrates the analysis results from the reaction analysis unit 11, environment analysis unit 12, signal analysis unit 13, and language analysis unit 14.

Information Integration Process by Information Integration Unit

Figure 7:
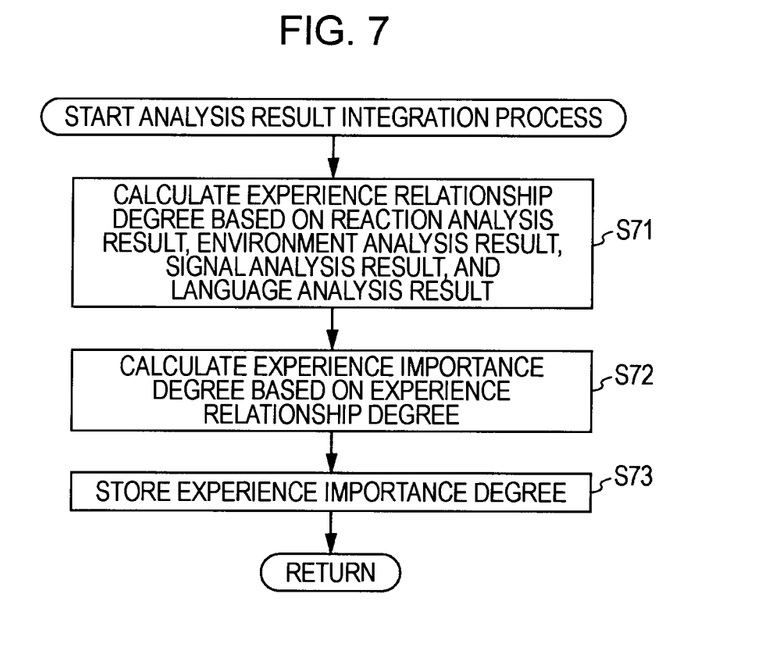
FIG. 7 is a flowchart showing an information integration process that an information integration unit performs.

Referring now to a flowchart of FIG. 7, an information integration process that the information integration unit 16 performs will be described.

In step S71, the relationship degree calculation unit 71a of the information integration control unit 71 calculates the experience relationship degree among the reaction analysis result from the reaction analysis unit 11, the environment analysis result from the environment analysis unit 12, the signal analysis result from the signal analysis unit 13, and the language analysis result from the language analysis unit. For example, the relationship degree calculation unit 71a calculates the experience relationship degree by obtaining the signal or language correlation or similarity between the user situation analysis result (reaction analysis result and environment analysis result) and the content analysis result (signal analysis result and language analysis result).

More specifically, the relationship degree calculation unit 71a calculates a latent (statistic process basis) or semantic (dictionary basis) experience relationship degree by performing a feature quantity analysis technology or language analysis technology on the user situation analysis result and content analysis result.

Examples of the feature quantity analysis technology include a technique that obtains the correlation between context indicating the situation of the user and the feature quantity of content by mapping the context and the feature quantity on the same plane, as described in, for example, Japanese Unexamined Patent Application Publication No. 2007-172523. Also, a technique may be used to add a cluster corresponding to a mood obtained through learning to a tune having a feature quantity not corresponding to the user's feeling (mood), as described in, for example, Japanese Unexamined Patent Application Publication No. 2007-207218.

For example, the relationship degree calculation unit 71a obtains the correlation between the reaction analysis result, text data "I am sad," and the signal analysis result, mood "sad," which a feature quantity, and thus calculates an experience relationship degree $C_1=1.0$.

Also, the relationship degree calculation unit 71a obtains the correlation between the environment analysis result, text data "healing," and the signal analysis result, mood "healing," which is a feature quantity, and thus calculates an experience relationship degree $C_2=1.0$.

Examples of the language analysis technology include a technique that creates analysis targets on the same space latently using probabilistic latent semantic analysis (PLSA), as described in, for example, Japanese Unexamined Patent Application Publication No. 2007-241888.

For example, the relationship degree calculation unit 71a obtains the latent similarity between the reaction analysis result, text data "I am broken hearted," and the language analysis result, text data "broken heart," which is a lyrics phrase, and thus calculates an experience relationship degree $C_3=0.8$.

The relationship degree calculation unit 71a also obtains the latent similarity between the environment analysis result, text data "convenience store," and the language analysis result, text data "convenience store," which is a lyrics phrase, and thus calculates an experience relationship degree $C_4=1.0$.

The relationship degree calculation unit 71a also obtains the latent similarity between the reaction analysis result, text data "an increase in energy," and the language analysis result, text data "vigorous," which is a lyrics phrase, and thus calculates an experience relationship degree $C_5=0.9$.

The feature quantity analysis technology and language analysis technology may be other than the above-mentioned ones.

In this way, the relationship degree calculation unit 71a calculates an experience relationship degree indicating the relationship between information about the user's reaction or surroundings at the time when the user views and listens to content and information about the content itself on the basis of the signal or language correlation between the user situation analysis result and content analysis result. The association degree calculation unit 71a may calculate an experience relationship degree between the reaction analysis result and environment analysis result or between the signal analysis result and language analysis result, which is not mentioned above. In other words, the relationship degree calculation unit 71a may calculate an experience relationship degree between any two of the reaction analysis result, environment analysis result, signal analysis result, and language analysis result.

In step S72, the importance degree calculation unit 71b performs a predetermined operation on the experience relationship degree calculated by the association degree calculation unit 71a so as to calculate the importance degree of a content experience. For example, the importance degree calculation unit 71b sums up the experience relationship degrees C1 and C5 and thus obtains an experience importance degree $I=4.7(=1.0+1.0+0.8+1.0+0.9)$. Also, for example, considering the experience relationship degrees as vectors, the importance degree calculation unit 71b may obtain the sum of the cosine distances between the vectors as the experience importance degree. The cosine distance here refers to a value obtained by dividing the inner product of two vectors by the product of the absolute values of the vectors. The experience importance degree may be obtained using operation techniques other than the above-mentioned technique.

The importance degree calculation unit 71b provides, to the information integration storage unit 72, the calculated importance degree of the content experience, the name of the experienced content, and text data (hereafter referred to as a "keyword") corresponding to the content analysis result used to calculate the experience relationship degree in such a manner that these items are associated with one another. For example, the importance degree calculation unit 71b provides, to the information integration storage unit 72, an experience importance degree "4.7" about the tune A, the content name "tune A," and text data ("sad," "healing," "refreshing," etc. and "broken heart," "convenience store," "vigor," etc.) corresponding to the content analysis result (signal analysis result and language analysis result) in such a manner that these items are associated with one another.

In step S73, the information integration storage unit 72 stores the experience importance degree from the information integration control unit 71.

The above-mentioned process allows calculating the experience importance degree with respect to viewing and listening of content by the user on the basis of the relationship between the situations of the user himself/herself and user's surroundings at the time when the user views and listens to the content and the feature quantity of the content itself, such as a mood, or language information such as lyrics.

Described above is the process of calculating the importance degree of content experience on the basis of the situation of the user at the time when the user experiences the content. Next, there will be described a process of, in cases such as one where the user newly experiences content, recommending content optimum for the user at that time on the basis of previously calculated experience importance degrees.

Content Recommendation Process by Information Processing System

Referring now to a flowchart of FIG. 8, a content recommendation process that the information processing system of FIG. 1 performs will be described. The content recommendation process is performed when the user input unit 81 receives, for example, an operation for obtaining a content recommendation.

In step S91, the content experience operation unit 82 determines whether the user has inputted a search keyword for retrieving content to be viewed and listened to by operating the user input unit 81.

If it is determined in step S91 that the search keyword has been inputted, the content experience operation unit 82 obtains the search keyword in step S92 and provides the search keyword to the retrieval unit 92a of the content recommendation operation unit 92 via the information integration management unit 71.

In contract, if it is determined in step S91 that no search keyword has been inputted, step S92 is skipped and the process proceeds to step S93.

In step S93, the content experience operation unit 82 determines whether, when operating the user input unit 81, the user has instructed the information processing system to perform a reaction analysis process.

If it is determined in step S93 that the information processing system has been instructed to perform a reaction analysis process, the content experience operation unit 82, in step S94, causes the reaction analysis operation unit 24 to perform a reaction analysis process, via the information integration control unit 71. Step S94 is the same as step S24 of the flowchart of FIG. 3 described above except that the analysis result is provided to the retrieval unit 92a via the information integration unit 16 and therefore will not be described.

Note that, in step S94, the reaction analysis unit 11 does not handle information corresponding to the reaction of the user at the time when the user views and listens to content but handles, as reaction information, for example, information corresponding to an email or diary inputted by the user or a description made by the user on a web page via the Internet before the user views and listens to the content.

In contract, if it is determined in step S93 that the information processing system has not been instructed to perform a reaction analysis process, step S94 is skipped and the process proceeds to step S95.

In step S95, the content experience operation unit 82 determines whether, when operating the user input unit 81, the user has instructed the information processing system to perform an environment analysis process.

If it is determined in step S95 that the information processing system has been instructed to perform an environment analysis process, the content experience operation unit 82, in step S96, causes the environment analysis operation unit 33 to perform an environment analysis process, via the information integration control unit 71. Step S96 is the same as step S34 of the flowchart of FIG. 4 described above except that the analysis result is provided to the retrieval unit 92a via the information integration unit 16 and therefore will not be described.

Note that, in step S96, the environment analysis unit 12 does not handle information about the environment at the time when the user views and listens to content but handles, as environment information, information about the user's existing place, the temperature thereof, and user's other surroundings before the user views and listens to the content.

In contract, if it is determined in step S95 that the information processing system has not been instructed to perform an environment analysis process, step S96 is skipped and the process proceeds to step S97.

In step S97, the retrieval unit 92a retrieves content to be recommended on the basis of at least one of the search keyword, reaction analysis result, and environment analysis result. For example, the retrieval unit 92a retrieves an experience importance degree corresponding to a keyword matching the search keyword from among the experience importance degrees stored in the content recommendation storage unit 91. For example, if the user inputs a search keyword "sad," the retrieval unit 92a retrieves an experience importance degree corresponding to the keyword "sad" and determines content corresponding to the retrieved experience importance degree, as content to be recommended (recommendation candidate).

Figure 9:
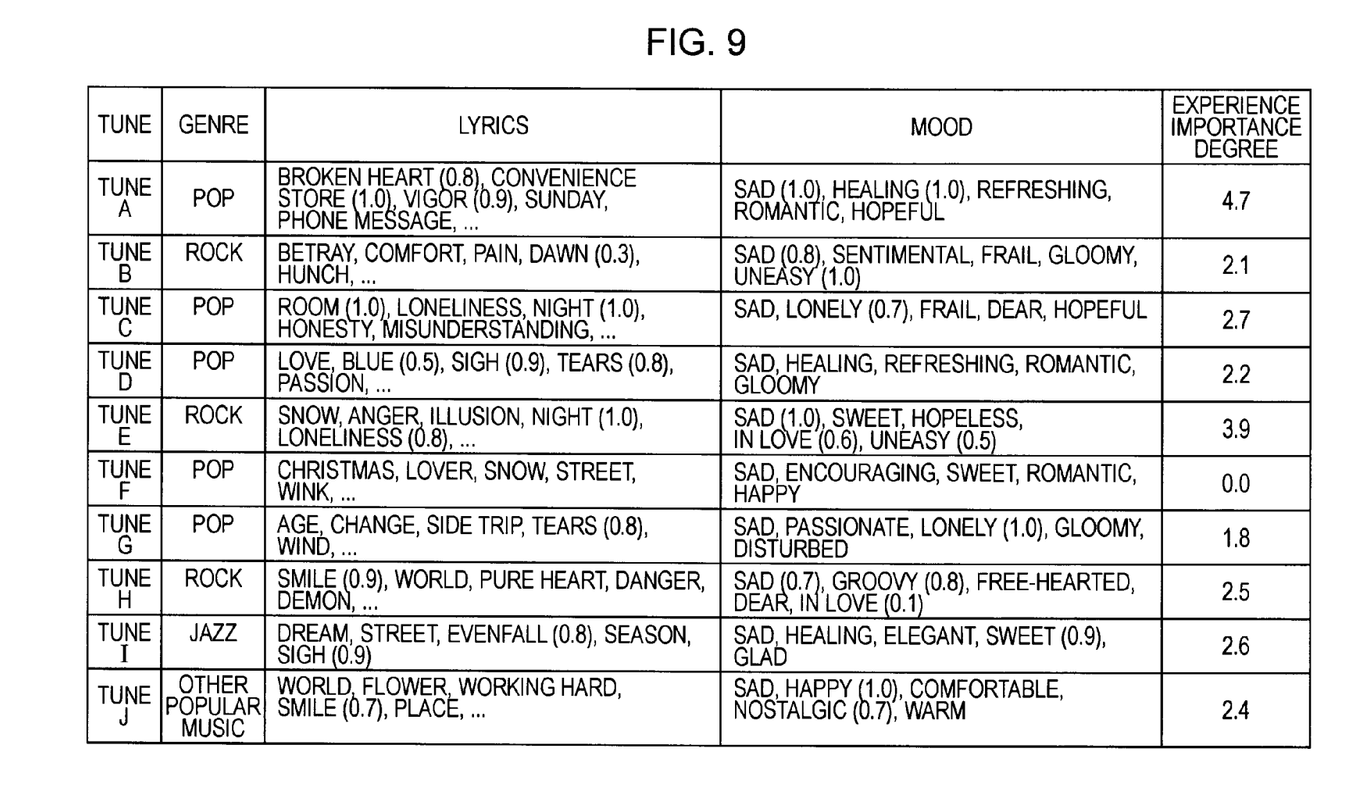
FIG. 9 is a table showing an example of the list of pieces of content retrieved by a retrieval unit.

FIG. 9 shows an example of the list of pieces of content retrieved by the retrieval unit 92a. In FIG. 9, with the title (name) of each tune (content), are associated a genre, lyrics phrases serving as keywords, moods, and an experience importance degree. The genre is one of pieces of meta-data about the content (tune). Other items may be used instead of the genre. For example, the retrieval unit 92a may retrieve content using the genre as a keyword.

In FIG. 9, for example, with the tune A, are associated a genre "pop," pieces of text data "broken heart (0.8)," "convenience store (1.0)," "vigor (0.9)," "Sunday," "phone message," and the like, which are lyrics phrases, moods "sad (1.0)," "healing (1.0)," "refreshing," "romantic," and "hopeful", and an experience importance degree "4.7." In the drawing, the parenthesized values as seen in "broken heart (0.8)" represent the experience relationship degrees calculated to obtain the experience importance degrees. With a tune B, are associated a genre "rock," keywords "betrayal," "comfort," "pain," "dawn (0.3)," "hunch," and the like, which are lyrics phrases, moods "sad (0.8)," "sentimental," "frail," "gloomy," and "uneasy (1.0)," and an experience importance degree "2.1." Likewise, with tunes C to J, are associated genres, words in the lyrics, moods, and experience importance degrees.

As shown in FIG. 9, with any tune, is associated the keyword "sad" indicating a mood. That is, if the user inputs a search keyword "sad," the retrieval unit 92a determines the ten pieces of content shown in FIG. 9, the tunes A to J, as pieces of content to be recommended (recommendation candidates).

Figure 8:
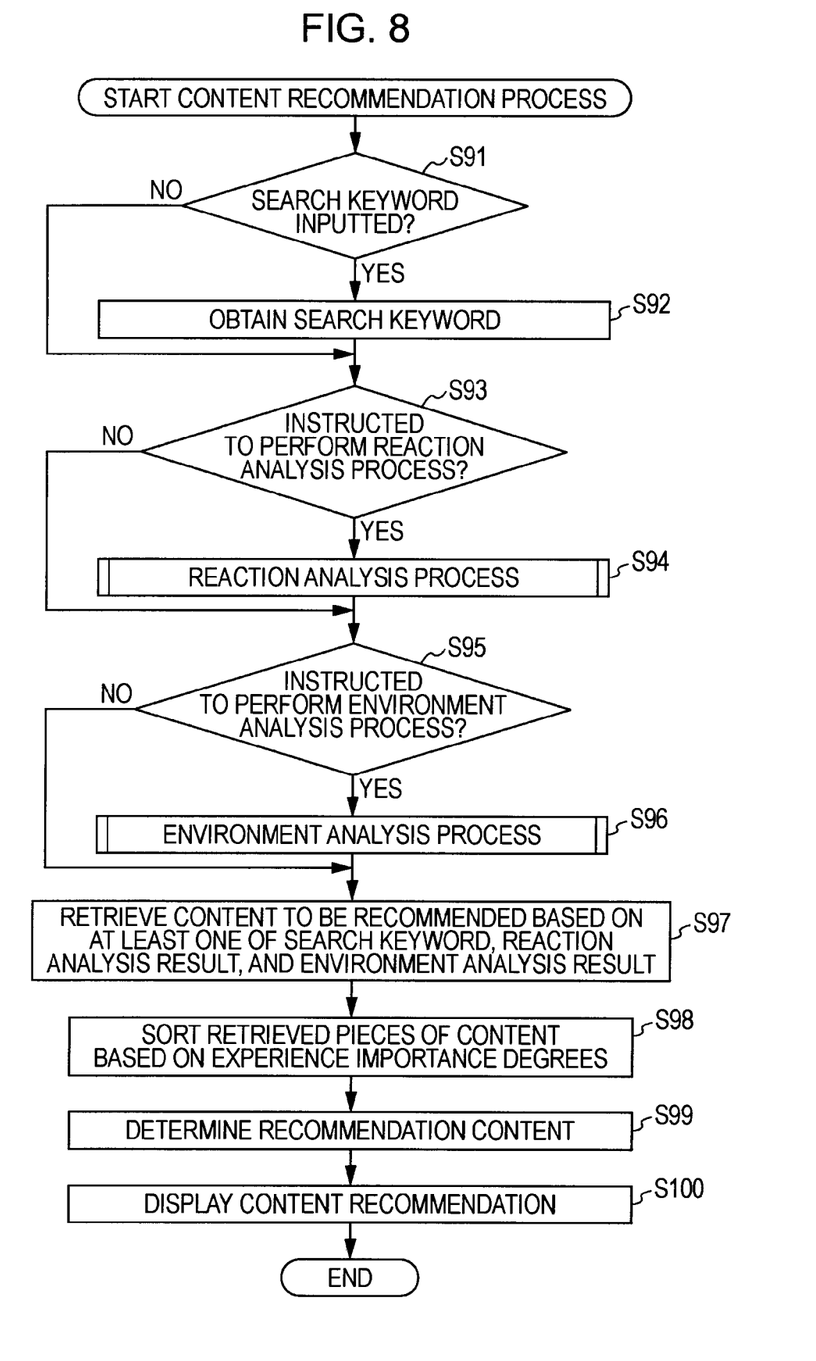
FIG. 8 is a flowchart showing a content recommendation process that the information processing system performs.

Referring back to the flowchart of FIG. 8, in step S98, the sorting unit 92b sorts pieces of content retrieved by the retrieval unit 92a, according to the corresponding experience importance degrees. For example, the sorting unit 92b sorts the tune A to J shown in FIG. 9 in the descending order of experience importance degrees. More specifically, the sorting unit 92b sorts the tune A to J shown in FIG. 9 in the order of the tunes A, E, C, I, H, J, D, B, G, and F. If multiple pieces of content have the same experience importance degree, for example, a piece of content experienced by the user more recently thereof may be sorted in an upper place.

In step S99, the determination unit 92c determines a piece of content having a high experience importance degree, that is, a piece of content corresponding to an episode among the pieces of content sorted by the sorting unit 92b, as recommendation content to be recommended to the user. The determination unit 92c provides a content recommendation (e.g., the name of recommendation content) to the content experience operation unit 82 via the information integration unit 16. For example, the determination unit 92c determines, as recommendation content, pieces of content having a content experience importance degree higher than a predetermined threshold (e.g., 20) among the pieces of content sorted in the order of the tunes A, E, C, I, H, J, D, B, G, and F. In this case, eight pieces of content, tunes A, E, C, I, H, J, D, and B, are determined as recommendation content. The determination unit 92c provides a content recommendation to the content experience operation unit 82 via the information integration unit 16. At that time, along with the content recommendation, the determination unit 92c may provide, as meta-data, those having high experience relationship degrees among the lyrics phrases and moods (keywords) associated with the pieces of recommendation content to the content experience operation unit 82.

For example, in step S99, the determination unit 92c may determine, as recommendation content, pieces of content corresponding to the highest five content experience importance degrees among the pieces of content sorted in the order of the tunes A, E, C, I, H, J, D, B, G, and F. In this case, five pieces of content, tunes A, E, C, I, and H, are determined as recommendation content. The number of the highest content experience importance degrees may be a number other than five.

In step S100, the content experience operation unit 82 causes the content experience display unit 84 to display the content recommendation (the name of recommendation content) provided by the determination unit 92c via the information integration unit 16. If those having high experience relationship degrees among the keywords associated with the recommendation content are provided as meta-data by the determination unit 92c, the keywords may be displayed as meta-data along with the content recommendation.

At that time, in order to remind the user of an episode, the content experience operation unit 82 may read information corresponding to the reaction of the user or the environment at the time when the user experienced the recommendation content in the past, from the reaction analysis storage unit 23 or environment analysis storage unit 32 via the information integration unit 16. For example, the content experience operation unit 82 may cause the content experience display unit 84 to indicate that the recommendation content is the tune A, as well as to display sentences such as "I went to a "convenience store" while listening to the tune A," ""healing" was a vogue word in those days," and "I listened to the tune A and murmured, "I am sad.""

The above-mentioned process allows, in a case when the user newly experiences content, recommending content on the basis of an experience importance degree calculated on the basis of the relationship between the situations of the user himself/herself and the user's surroundings at the time when the user viewed and listened content in the past and the feature quantity of the content itself, such as a mood, or language information such as lyrics. This allows recommending optimum content corresponding to the situation of the user.

The recommended content is content corresponding to a content experience having a high experience importance degree, that is, content corresponding to an episode that was particularly impressive for the user. Accordingly, the recommended content can remind the user of the impressive past memory.

Described above is the example where content is retrieved on the basis of a search keyword in step S97. On the other hand, in a case where content is retrieved on the basis of a reaction analysis result or environment analysis result, the retrieval unit 92a retrieves content whose number of keywords matching keywords corresponding to the analysis result is larger than a predetermined number. Also, in a case where content is retrieved on the basis of any two or all of a search keyword, a reaction analysis result, and an environment analysis result, content meeting these conditions will be retrieved.

Also, in a case where the retrieval unit 92a retrieves content by binarizing a feeling of the user on the basis of a reaction analysis result and an environment analysis result, that is, a user situation analysis result before the user newly views and listens to the content, the retrieval unit 92a may retrieve content on the basis of corresponding preference information and the binarized user feeling.

The content recommendation process of FIG. 8 has been described assuming that the process is performed in a case where the user newly views and listens to content. On the other hand, if no search keyword acquisition process is performed in steps S91 and S92, the content recommendation process may be performed not only in a case where the user newly views and listens to content but also, for example on the basis of a user situation analysis result obtained in the daily life of the user. This allows recommending content corresponding to the situations of the user himself or herself and user's surroundings in the daily life without the user having to perform an operation for requesting recommendation content.

The above-mentioned series of processes may be performed by any of hardware and software. In a case where the series of processes are performed by software, a program constituting the software is installed from a storage medium into a computer included in dedicated hardware, a general-purpose personal computer that can perform various functions by having various programs installed therein, or the like.

Figure 10:
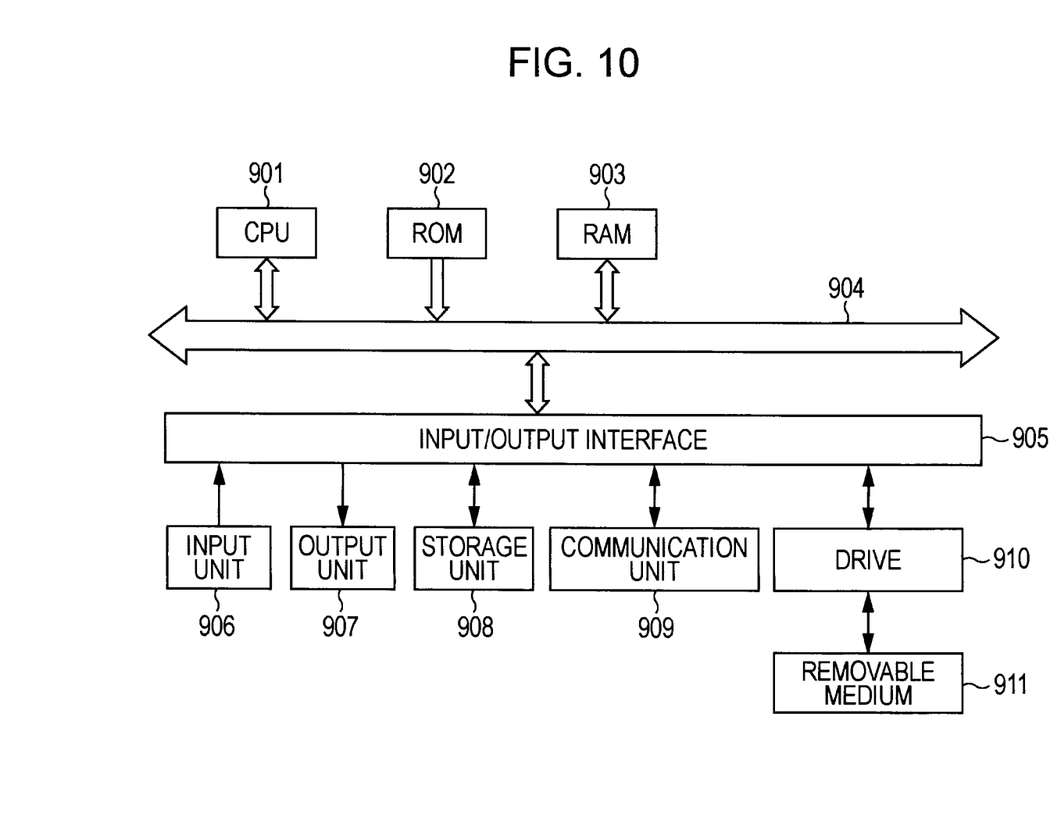
FIG. 10 is a diagram showing an example configuration of a general-purpose computer.

FIG. 10 shows an example configuration of such a general-purpose computer. This personal computer includes a central processing unit (CPU) 901. Connected to the CPU 901 via a bus 904 is an input/output interface 905. Connected to the bus 904 are a read only memory (ROM) 902 and a random access memory (RAM) 903.

Connected to the input/output interface 905 are an input unit 906 composed of input devices by which the user inputs operation commands, such as a keyword and mouse, an output unit 907 that outputs a process operation screen or a process result image to a display device, a storage unit 908 composed of a hard disk drive or the like that stores programs and various types of data, and a communication unit 909 that is composed of a local area network (LAN) adapter and performs communication processes via a network typified by the Internet. Also connected to the input/output interface 905 is a drive 910 that reads or writes data from or to a removable medium 911 such as a magnetic disk (e.g., a flexible disk), optical disk (e.g., a compact disc read-only memory (CD-ROM) or digital versatile disc (DVD)), optical magnetic disc (e.g., Mini Disc (MD)), or semiconductor memory.

The CPU 901 performs various processes in accordance with programs stored in the ROM 902 or programs that are read from the removable medium 911, installed into the storage unit 908, and loaded from the storage unit 908 into the RAM 903. Data or the like necessary for the CPU 901 to perform various processes is stored in the RAM 903, if necessary.

In this specification, the step of writing a program to be stored in a storage medium includes not only processes that are performed chronologically according to the written order but also processes that are not typically performed chronologically but performed simultaneously or separately.

In this specification, the system represents a whole apparatus including multiple apparatuses or processing units. In other words, the information processing system of FIG. 1 may be composed of a single apparatus such as the personal computer of FIG. 10 or construed as such an apparatus.

The present application contains subject matter related to that disclosed in Japanese Priority Patent Application JP 2009-112016 filed in the Japan Patent Office on May 1, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a processor;
said processor configured to calculate an experience importance degree of content for a user on the basis of a relationship among a reaction analysis result obtained by performing a predetermined analysis on a reaction of the user to the content at the time when the user experiences the content, the reaction being an attitude of the user, an environment analysis result obtained by performing a predetermined analysis on an external environment of the user at the time when the user experiences the content, a signal analysis result obtained by performing a predetermined analysis on a video signal or voice signal of the content, and a language analysis result obtained by performing a predetermined language analysis on language information described about the content;
determine, if the experience importance degree of the content calculated by importance degree calculation means is high, determine the content as recommendation content to be recommended to the user;
calculate a relationship degree indicating a degree of the relationship among the reaction analysis result, the environment analysis result, the signal analysis result, and the language analysis result; and
sort pieces of content experienced by the user in accordance with corresponding experience importance degrees calculated.

2. The information processing apparatus according to claim 1,
wherein the processor is configured to calculate the experience importance degree by performing a predetermined operation on the relationship degree calculated.

3. The information processing apparatus according to claim 2, wherein the processor is configured to calculate the relationship degree by performing a feature quantity analysis or language analysis on the reaction analysis result, the environment analysis result, the signal analysis result, and the language analysis result.

4. The information processing apparatus according to claim 1,
wherein the processor is configured to determine, as the recommendation content, a piece of content having a high experience importance degree among the pieces of content sorted.

5. The information processing apparatus according to claim 4, wherein the processor is further configured to:
sort the pieces of content in the descending order of the corresponding experience importance degrees; and
determine, as the recommendation content, a piece of content having an experience importance degree higher than a predetermined threshold among the pieces of content sorted.

6. The information processing apparatus according to claim 4, wherein the processor is further configured to:
sort the pieces of content in the descending order of the corresponding experience importance degrees; and
determine, as the recommendation content, pieces of content corresponding to highest n experience importance degrees among the pieces of content sorted.

7. The information processing apparatus according to claim 4, wherein the processor is further configured to:
retrieve a piece of content from among the pieces of content on the basis of one or both of a reaction analysis result and an environment analysis result performed after the pieces of content are experienced; and
sort pieces of content retrieved in accordance with corresponding experience importance degrees.

8. An information processing method comprising the steps of:
calculating an experience importance degree of content for a user on the basis of a relationship among a reaction analysis result obtained by performing a predetermined analysis on a reaction of the user to the content at the time when the user experiences the content, the reaction being an attitude of the user, an environment analysis result obtained by performing a predetermined analysis on an external environment of the user at the time when the user experiences the content, a signal analysis result obtained by performing a predetermined analysis on a video signal or voice signal of the content, and a language analysis result obtained by performing a predetermined language analysis on language information described about the content; if the experience importance degree of the content calculated in the experience importance degree calculation step is high, determining the content as recommendation content to be recommended to the user,
calculating a relationship degree indicating a degree of the relationship among the reaction analysis result, the environment analysis result, the signal analysis result, and the language analysis result; and
sorting pieces of content experienced by the user in accordance with corresponding experience importance degrees calculated.

9. A non-transient computer-readable medium causing a computer to perform a process comprising the steps of:
calculating an experience importance degree of content for a user on the basis of a relationship among a reaction analysis result obtained by performing a predetermined analysis on a reaction of the user to the content at the time when the user experiences the content, the reaction being an attitude of the user, an environment analysis result obtained by performing a predetermined analysis on an external environment of the user at the time when the user experiences the content, a signal analysis result obtained by performing a predetermined analysis on a video signal or voice signal of the content, and a language analysis result obtained by performing a predetermined language analysis on language information described about the content; and if the experience importance degree of the content calculated in the experience importance degree calculation step is high, determining the content as recommendation content to be recommended to the user, calculating a relationship degree indicating a degree of the relationship among the reaction analysis result, the environment analysis result, the signal analysis result, and the language analysis result; and sorting pieces of content experienced by the user in accordance with corresponding experience importance degrees calculated.

10. An information processing apparatus comprising:
a processor;
said processor configured to calculating an experience importance degree of content for a user on the basis of a relationship among a reaction analysis result obtained by performing a predetermined analysis on a reaction of the user to the content at the time when the user experiences the content, the reaction being an attitude of the user, an environment analysis result obtained by performing a predetermined analysis on an external environment of the user at the time when the user experiences the content, a signal analysis result obtained by performing a predetermined analysis on a video signal or voice signal of the content, and a language analysis result obtained by performing a predetermined language analysis on language information described about the content;

determining, if the experience importance degree of the content calculated by importance degree calculation means is high, determine the content as recommendation content to be recommended to the user;

calculating a relationship degree indicating a degree of the relationship among the reaction analysis result, the environment analysis result, the signal analysis result, and the language analysis result; and sorting pieces of content experienced by the user in accordance with corresponding experience importance degrees calculated.

* * * * *